Sept. 20, 1971 R. O. WYNN 3,605,948
LUBRICANT FITTING FOR VALVES
Filed Jan. 20, 1970

Robert O. Wynn
INVENTOR

BY *James Jackson*
ATTORNEY

United States Patent Office 3,605,948
Patented Sept. 20, 1971

3,605,948
LUBRICANT FITTING FOR VALVES
Robert O. Wynn, Houston, Tex., assignor to ACF
Industries, Incorporated, New York, N.Y.
Filed Jan. 20, 1970, Ser. No. 7,282
Int. Cl. F01m 1/18; F16n 21/06
U.S. Cl. 184—6.4
8 Claims

ABSTRACT OF THE DISCLOSURE

Injection of lubricant material into valves or other pressure vessels subject to extremely high pressure, is accomplished by a lubricant fitting including a plurality of sequentially operable valves of various constructions in order to achieve proper connection of the lubricant fitting to a lubricant supply system without risking erosion of the valve seats within the lubricant fitting by the high pressure fluid within the valve or pressure vessel. The lubricant fitting also includes a frangible portion that will enable the fitting to become severed at a preselected portion thereof, in the event the lubricant fitting is subjected to extremely high impact forces. The fitting also includes a safety valve structure that is disposed at the inner most portion of the lubricant fitting inwardly of the frangible portion thereof, in order that a fluidtight seal may be developed to prevent valve leakage in the event the lubricant fitting should inadvertently become severed. In order to assist in preventing erosion of the valve seats within the lubricant fitting, the velocity of fluid flow through the lubricant fitting is maintained at a low level by an internal restricted portion of the lubricant passage formed therein.

BACKGROUND OF THE INVENTION

Frequently, wellhead valves and large pipeline valves require the provision of the lubrication systems in order to provide for proper lubrication of internal parts thereof and to provide for efficient sealing where lubricant material is employed as a sealant. Ordinarily, lubricant fittings are provided that employ a small spring biased ball check valve that is retained within the threaded aperture in the valve body and is displaced by lubricant material when the lubricant is injected into the valve. In the event high velocity fluid flow is allowed through the lubricant fitting, the ball check will frequently be caused to vibrate within its valve chamber, thereby causing distortion of the ball sealing surface or the seat surface to such a severe degree that the ball check will cease to maintain fluidtight seal. When a valve is lubricated, the internal pressure is usually bled off to prevent overpressuring the valve as sufficient lubricant is injected into the valve to insure adequate lubrication and sealing. When high pressure is bled off, present lubricant fittings and relief valves may be subjected to erosion by abrasive materials such as sand, pipe scale and the like that may be entrained in the high velocity flow of fluid being bled off. Moreover, if the fluid is corrosive in nature, the spring and ball of ball check type fittings being subjected to the corrosive material at all times may become corroded to such extent that the sealing function of the ball check may become impaired.

Lubricant fittings ordinarily project outwardly from the valve body and frequently are struck and broken by heavy structural equipment being moved about in the vicinity of the valve structure. It is advantageous to provide a safety device that will allow the development of a proper fluidtight seal in the event the lubricant sealing structure is completely severed or damaged to the degree that sealing will not occur.

It is, therefore, a primary object of the present invention to provide a novel lubricant fitting for valves and alike, utilizing internal valving elements that may be employed sequentially in order to prevent erosion of the valve and seat surfaces within the lubricant fitting which might otherwise be caused by the flow of high velocity fluid.

It is another object of the present invention to provide a novel lubricant fitting structure that employs internal fluid passage structure having restrictions that prevent fluid from flowing through the lubricant fitting structure at high velocity.

Among the several objects of this invention is noted the provision of a novel lubricant fitting structure including a frangible portion that allows the lubricant fitting to break at a preselected location in the event severe forces are inadvertently applied against the lubricant fitting structure.

It is an even further object of this invention to provide a novel lubricant fitting structure that incorporates a safety valve structure that will move to its closed position automatically upon breaking of the lubricant fitting or upon preselected linearly movement of the internal structure of the lubricant fitting.

It is another important object of this invention to provide a novel lubricant fitting structure for valves and alike which is simple in nature, reliable in use and low in cost.

Other and further objects, advantages and features of this invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the spirit and scope of the invention. Such description will be referred to by reference characters in the drawings in which:

Briefly, the invention concerns a lubricant fitting structure comprising a body that is threadedly received within the wall structure of a valve or other pressure vessel. An insert is received within the body structure and includes a lubricant passage in order to conduct lubricant material from an external source to flow passage structure formed in the body portion of the lubricant fitting. The upper portion of the insert is provided with suitable connection means to receive a "quick disconnect" type lubricant supply fitting adapter. When lubricant is not being injected into the lubricant fitting structure, a cap member is attached to the insert portion of the lubricant fitting and includes a valve element that is disposed in engagement with a seat element formed in the insert in order to prevent the flow of fluid through the lubricant fitting. A second valve seat formed within the body structure is engaged by a valve element carried by the insert portion of the lubricant fitting in order to provide additional valving capability to enhance protection against fluid flow through the lubricant fitting structure. In the event high pressure fluid is allowed to flow through the lubricant fitting structure, a restricted portion of the insert passage structure maintains the velocity of fluid flow through the structure at a low level, thereby protecting the valve seat structure and passage structure of the lubricant fitting against erosion by high pressure fluid. The lubricant fitting is also provided with a safety valve portion including a safety valve that will remain with the valve or pressure vessel in the event the lubricant fitting is inadvertently severed by machinery or the like moving in the vicinity of the valve. The body portion of the lubricant fitting is provided with a frangible portion in order to allow severance of the body structure only at a preselected location thereon.

Figure 1:
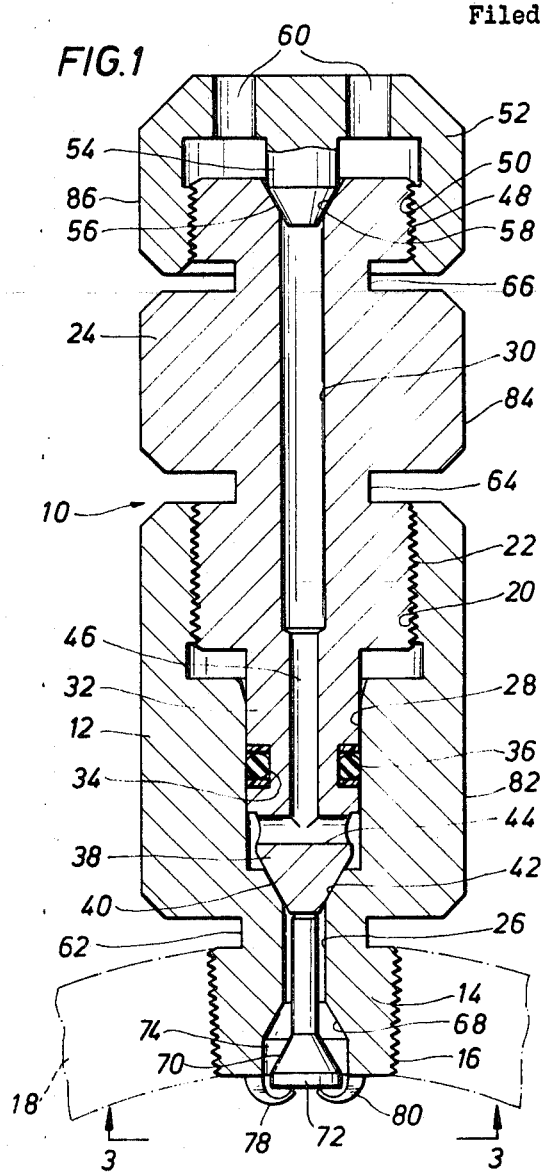
FIG. 1 is a sectional view of a lubricant fitting structure constructed in accordance with the present invention.

With reference now to the drawings for a better understanding of the invention, in FIG. 1 is illustrated a lubricant fitting, structure shown generally at 10, that includes a body portion 12 having a connector extension 14 that is provided with external threads 16 adapted to be received in an internally threaded aperture in the wall structure 18 of a valve, a pressure vessel or the like. The body portion 12 of the lubricant fitting structure is provided with internal threads 20 at the upper extremity thereof that receives the externally threaded portion 22 of an insert member 24. The valve body portion 12 is provided with a fluid passage 26 therein that is defined in part by the internally threaded portion of the lubricant fitting and by a generally cylindrical bore 28.

The insert portion 24 of the lubricant fitting is provided with an elongated generally cylindrical extension 32 that is received in close fitting relation within the cylindrical bore 28. An annular seal groove 34 is formed in the cylindrical extension 32 and receives sealing means 36 for the establishment of sealing engagement between the extension 32 and the cylindrical bore 28. The annular packing or sealing means 36 may be any one of a number of commercially acceptable sealing means without departing from the spirit or scope of this invention.

The extension 32 of the insert 34 is provided with a terminal valving portion 38 defining a frusto-conical sealing surface 40. The sealing surface 40 is capable of being received in sealing engagement with a valve seat 42 defining a portion of the fluid passage 26 as the insert member 24 is threaded fully into the body 12. The terminal valving portion 38 of the extension 32 is of smaller diameter than the diameter of the extension 32 in order to allow the free flow of fluids past the valving portion when the insert 24 is partially unthreaded from the body 12 and is moved linearly away from the valve seat 42. A transverse passage 44 is formed through the terminal portion of the insert extension and establishes fluid communication with the lubricant passage 30 and provides for communication for lubricant material and fluid past the valving portion 38 of the extension 32.

In order to maintain the flow of fluid through the lubricant fitting structure at a low velocity level, the lubricant passage 30 is provided with a restricted portion 46 thereof that is of sufficiently limited dimension as to limit the velocity of fluid flow even though the pressure within the valve or pressure vessel may be quite high. This feature effectively prevents erosion of either of the valve seats of the lubricant fitting by sand, line scale or other foreign material that may be entrained within the line fluid.

The upper portion of the insert 24 is provided with external threads 48 that are adapted to receive internal threads 50 of a cap member 52 that forms an external closure for the lubricant fitting. The cap member 52 is provided with a centrally located depending valve projection 54 having a generally frusto-conical sealing surface 56 formed thereon and disposed for sealing engagement with a frusto-conical seat 58, defining the uppermost portion of the lubricant passage 30. As the cap member 52 is threaded onto the upper threaded portion of the insert 24, the frusto-conical sealing surface 56 will move linearly and rotatively into sealing engagement with the frusto-conical seat 58. The closure or cap 52 is also provided with at least one and preferably a plurality of vent apertures 60 that allows the venting of any fluid pressure within the lubricant fitting immediately upon breaking the seal between the frusto-conical surface 56 and the seat surface 58. This feature prevents the cap 52 from being blown from the lubricant fitting after it has been completely unthreaded therefrom if any pressure has accumulated within the lubricant fitting structure.

In order to provide for positive safety valving in the event that the lubricant fitting is impacted to a sufficient degree that it might be damaged by heavy equipment or the like moving in the vicinity thereof, the valve body portion 12 of the lubricant fitting is provided with an annular groove 62 that defines a frangible portion that will break upon the application of predetermined forces to the lubricant fitting structure. The frangible portion of the body 12, defined by the groove 62, assures that the lubricant fitting structure will always become severed at a predetermined location to assure that leakage will not occur in the event the lubricant fitting structure should become damaged. The insert 24 is provided with annular grooves 64 and 66 that also define frangible areas where severance might occur in the event the insert portion is subjected to severe impact forces.

Figure 2:
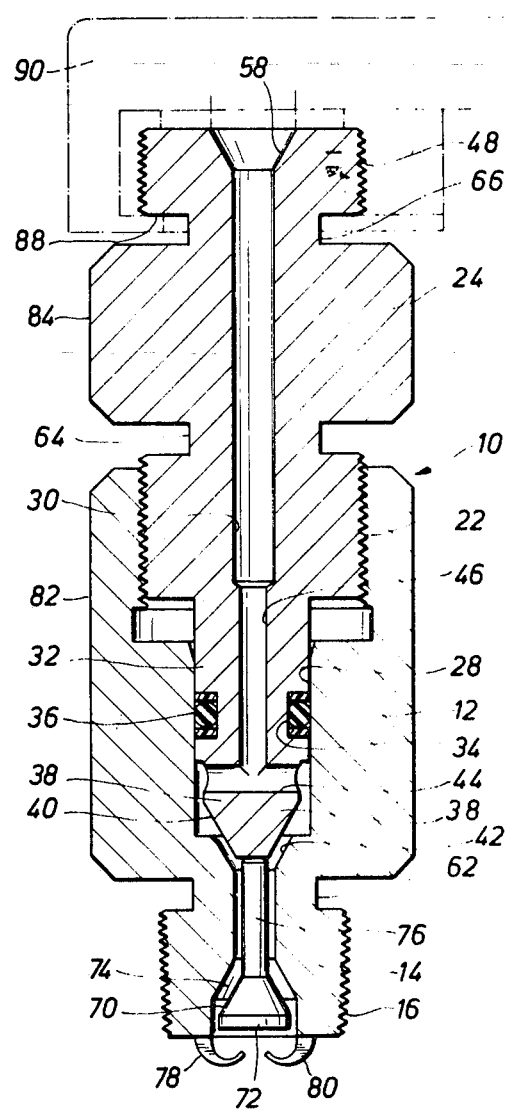
FIG. 2 is a sectional view of the lubricant fitting structure of FIG. 1 with the cap structure removed and with the insert member retracted to open, an internal valve element.

The fluid passage 26 through the connector extension 14 is defined in part by a generally frusto-conical safety seat 68, that is engaged by a frusto-conical surface 70 formed on a safety valve member 72, in order to provide a seal within the connector extension as desired. The safety valve 72 is loosely retained within an enlarged portion 74 of the fluid passage 26 and is provided with a control stem 76 that extends through the fluid passage 26. A pair of projections 78 and 80 at the lower extremity of the body portion 12 are deformed after the safety valve 72 has been placed within the enlarged portion 74 of the fluid passage in order to provide for proper retention of the safety valve structure. As illustrated in FIGS. 1 and 2, the safety valve structure 72 is intended to be maintained in the open position thereof either when the valving portion 38 of the insert extension is in the open or closed position. The safety valve 72, however, will be moved by fluid pressure to its closed position establishing a seal against the seat 68 in the event the insert should be unthreaded sufficiently from the body 12 to allow the valving portion 38 to move linearly away from any possibility of engagement with the control stem 76 of the safety valve. It is obvious, therefore, that the insert portion of the lubricant fitting may be completely unthreaded and removed in order to replace or repair portions thereof after assuring that the safety valve has been actuated by the fluid pressure into a positive sealing engagement within the connector extension 14.

In the event the lubricant fitting structure should be subjected to severe impact forces, by heavy equipment or the like moving in the vicinity of the lubricant fitting, the body portion 12 of the lubricant fitting may be caused to break at the frangible portion thereof defined by the groove 62. In the event this should occur, the safety valve 72 will be automatically moved by the internal pressure of the valve or pressure vessel into fluidtight engagement with the frusto-conical seat 68. It is seen, therefore, that even though the lubricant fitting structure should be damaged, causing severance of the body structure thereof, the safety valve 72 will establish a positive seal in order to prevent possible erosion of the remaining lubricant fitting structure that would otherwise result in the development of severe leakage of the valve or pressure vessel. It is also apparent that severance of the insert portion of the lubricant fitting either at the groove 64 or the groove 66, would not cause the remaining lubricant fitting structure to leak as long as the remaining portion of the insert 24 is fully threaded into the body 12 so that the valving portion 38 of the insert engages the seat 42 to maintain a positive seal.

Figure 3:
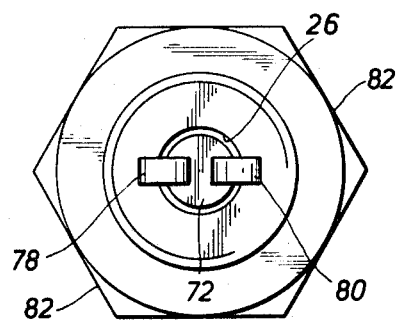
FIG. 3 is a view in full line taken along line 3—3 in FIG. 1.

The exterior surfaces of the body 12, the insert 24 and the cap 52, are provided with a plurality of planar surfaces 82, 84 and 86, respectively, as illustrated in FIG. 3, that are received by ordinary wrenches to allow proper manipulation of the various portions of the lubricant fitting structure.

The annular groove 66 of the insert 24, in addition to defining a frangible area that may break in the event severe forces are applied to the lubricant fitting structure, also defines an annular shoulder 88 that is engaged by the terminal connector portion 90 of a lubricant supply hose of conventional nature. After the cap structure 52 has been removed from the upper threads 48 of the insert, the terminal connector 90 is placed in the position illustrated in broken lines in FIG. 2 and lubricant material may be injected under pressure into the lubricant fitting structure. It is necessary to rotate the insert 24 unthreading it partially from the body 12 in order to cause the valving portion 38 to move away from the frusto-conical seat surface 42, so as to allow the flow of lubricant material through the lubricant fitting structure and into proper lubricant passage structure of the valve or pressure vessel.

In view of the foregoing, it is clearly apparent that I have provided a novel lubricant fitting structure that utilizes internal valving elements that may be employed sequentially in order to allow the injection of lubricant material into a valve or pressure vessel structure, without allowing the flow of valve fluid through the lubricant fitting structure. The lubricant fitting of my invention is provided with various valving elements that are not affected by corrosive action or erosive action that might occur due to the fluid controlled by the valve or pressure vessel. The lubricant fitting structure of my invention also incorporates a safety valve structure that will move to its closed position automatically upon breaking of the lubricant fitting or by predetermined linear movement of the internal insert portion thereof. This feature affectively prevents leakage of the valve or pressure vessel, either automatically or selectively and allows complete removal of the insert portion of the lubricant fittings, even when the valve or pressure vessel is maintained under fluid pressure. Erosion of the internal portion of the lubricant fitting is effectively precluded by a restricted portion of the lubricant passage structure of the insert that maintains the velocity of fluid flow through the lubricant fitting at a low level, regardless of the fluid pressure within the valve or pressure vessel. My invention, therefore, is clearly capable of attaining all of the objects and advantages hereinabove set forth, together with other objects and advantages that are obvious from an understanding of the invention itself.

Having thus described the present invention, what is claimed to be new and what is desired to be secured by Letters Patent is:

1. A lubricant fitting for valves and the like comprising a body having connection adapted to be received within an aperture formed in the wall structure of the valve, said body having a fluid flow passage extending therethrough, a first valve seat being formed within said body and defining a portion of said flow passage, a body insert being movable secured to said body within said flow passage and defining a valve element that engages said first seat to control the flow of fluid through said flow passage, passage means formed in said insert for conducting lubricant from an external grease supply to said flow passage, said insert having a second valve seat defining a portion of said lubricant passage, a cap member being movable secured to said insert body, said cap member having a valve element which establishes sealing engagement with said second seat in the closed position thereof, said cap member having pressure relief means formed therein and rendered operable upon opening of said valve element of said cap, said body insert having receiving means for said lubricant supply means.

2. A lubricant fitting as recited in claim 1, third valve seat means defined in said body, a safety valve element movably disposed within said body and being effective upon erosion of said first and second seats to effect a seal to prevent leakage, means to prevent actuation of said safety valve element until said insert is moved sufficiently or said body is severed.

3. A lubricant fitting as set forth in claim 2, said body having a frangible portion disposed outwardly of said third valve seat means whereby said safety valve portion of said fitting is retained in said valve aperture in order to maintain a positive seal in the event the fitting is inadvertently sheared off.

4. A lubricant fitting as recited in claim 1, said lubricant passage of said insert having restriction means formed therein whereby fluid flowing under high pressure through said fitting develops a pressure drop within said lubricant passage thereby maintaining the flow of fluid through said fitting at low velocity.

5. A lubricant fitting for valves and the like comprising body means having a flow passage defined therein and having an insert means movable retained within said body and cooperating with said body to define a first seal, lubricant passage means formed in said insert means, means cooperating with said lubricant passage in said insert means to define a second seal, said lubricant passage being restricted intermediate the extremities thereof whereby fluid flow through said fitting will create a pressure drop within said lubricant passage thereby maintaining the velocity of the flowing fluid at a low level to minimize erosion within said fitting, said fitting having means defining a third seal upon predetermined movement of said insert relative to said body or upon severance of said body, said body having a frangible portion thereof disposed outwardly of said means defining said third seal, whereby said body will always be severed in such manner as to assure development of said third seal.

6. A lubricant fitting comprising a body having an externally threaded extension adapted to be received within an internally threaded aperture of a valve or the like, said body having a fluid flow passage formed therein, a first valve seat defining a portion of said fluid flow passage, an insert being threadedly received by said body and having a valve element formed at one extremity thereof and disposed for registry with said first seat, lubricant passage means extending through said insert, a second valve seat defining a portion of said lubricant passage closure means being movably received by said insert and having a valve element disposed for registry with said second valve seat, a third valve seat defining a portion of said flow passage and being oppositely disposed with respect to said first valve seat, a safety valve element being carried by said body and being operative to move into sealing engagement with said third valve seat upon severance of body, said insert being capable of moving said safety valve element from said third valve seat.

7. A lubricant fitting according to claim 6, said body having a safety groove of reduced diameter formed in said extension outwardly of said third valve seat, said body, upon being subjected to severe impacts being frangible at said safety groove, whereby said extension and said safety valve will remain in said threaded aperture and will maintain a fluidtight seal in the event said body is severed.

8. A lubricant fitting according to claim 6, said safety valve being loosely retained within said flow passage and being normally open, a valve stem on said safety valve being disposed for engagement with said insert and normally preventing said safety valve from sealing, said safety valve being movable into sealing engagement with said third valve seat by fluid pressure upon linear movement of said insert away from said valve stem.

References Cited

UNITED STATES PATENTS

| | | | |
|---|---|---|---|
| 377,313 | 1/1888 | Laumann | 137—68 |
| 409,217 | 8/1889 | Mears | 137—68 |
| 841,095 | 1/1907 | Osborne | 137—68 |
| 1,411,483 | 4/1922 | Floyd | 137—68 |
| 2,632,462 | 3/1953 | Selwyn | 137—71X |
| 2,804,317 | 8/1957 | Prater | 137—68 |
| 2,945,503 | 7/1960 | Atkinson | 137—68 |

MANUEL A. ANTONAKAS, Primary Examiner

U.S. Cl. X.R.

137—68, 614.05; 184—105R